April 14, 1959 D. KLEIS ET AL 2,882,347

MAGNETIC ERASING HEAD

Filed Aug. 13, 1953

INVENTORS
DERK KLEIS
HERMANUS JOHANNES DE WITT
BY Fred M Vogel
AGENT 2,882,347

MAGNETIC ERASING HEAD

Derk Kleis and Hermanus Johannes de Witt, Eindhoven, Netherlands, assignors, by mesne assignments, to North American Philips Company, Inc., New York, N.Y., a corporation of Delaware Application August 13, 1953, Serial No. 374,036

Claims priority, application Netherlands September 4, 1952

9 Claims. (Cl. 179—100.2)

The invention relates to erasing heads for de-energising a magnetic record track or signal-carrying medium by means of an asymmetric alternating flux generated when asymmetric alternating current traverses a winding on the head, and comprising a magnetic circuit having at least one point of interruption relatively to which the record carrier is passed for the sake of erasing. The term "asymmetry" is to be understood to mean the unequal peak values of the field strength reckoned with respect to the zero line. Erasing systems employing such forms of alternating flux are ofter used in practice, because the production of a symmetrical alternating current wave form to produce symmetrical alternating flux is more difficult.

At the point of interruption, sometimes called gap, the said asymmetric magnetic alternating flux produces a field which is also asymmetric and which may bring the passing magnetic record carrier, such as a magnetic tape, into a condition such that the magnetic record track is erased. However, it is found, that in the case of asymmetry the carrier which again may be used for a subsequent recording process is responsible for a higher noise level than if the said erasing field had been of symmetrical nature. In addition, the asymmetric field may give rise to distortion due to even harmonics. The asymmetry results in the introduction of an imaginary direct current component which emphasizes the magnetic unevenness of the carrier. This becomes manifest in recording as the so-called modulation noise which is additive to the ground noise of the carrier.

The erasing head according to the invention is characterized in that the magnetic circuit is realized so as to give rise to local saturation in the circuit, the field strength at the point of interruption being sufficient as a result of the saturation flux to erase the record track at the point of interruption, the point of saturation in the circuit being arranged in a manner such that at the point of interruption the stray field set up in the surrounding area is small as compared with the erasing field. This has the advantage that at the point of interruption the alternating field set up in the magnetic circuit by the saturating flux is of symmetrical nature, since due to the limitation of the flux by the saturation value of the circuit the peak values of the flux are invariably the same in both directions. The above-mentioned disadvantage of modulation noise is thus substantially eliminated. The condition must be satisfied that the stray field of the saturation point in the magnetic circuit does not upset the symmetry, since otherwise the advantage of the invention would be lost wholly or in part.

It is well known that particularly at high frequencies iron losses and heat production are attendant on magnetic saturation and this adversely affects the erasing quality of the head. Their magnitude is governed inter alia by the volume of the saturated material. Since it is desirable to prevent heat production as far as possible, it is advantageous for the locally saturated part of the circuit to form a small port of the total magnetic circuit.

The saturation in the erasing head required for its satisfactory operation may be obtained in a number of ways. One advantageous manner is to produce saturation of the magnetic circuit by local reduction of its sectional area. Thus, for example, use may be made of an erasing head made of a magnetic ferrite and exhibiting a local constriction. Formation of this reduction in the circuit in a determined shape assists in conducting away the heat produced in loco so as to improve the erasing quality. It may also be preferable for part of the magnetic circuit to be made of material having a lower saturation field strength than the remaining part. When the flux increases saturation will occur more rapidly in the first-mentioned part than in the remaining part with the result that operation will have the same effect as in the above-mentioned case. An advantageous construction is obtained by arranging this part of the magnetic circuit to have the same sectional area as the remaining part.

Inter alia in view of the above-mentioned requirement regarding heat production and the correlated operating temperature of the erasing head it is preferable for the part of the magnetic circuit in which saturation occurs to be made of material having low electric losses. More particularly we have in mind an erasing head made of $\mu$-metal or ferrosilicon interrupted by a part made of magnetic ferrite.

As has been stated hereinbefore, the stray field due to the local saturation in a part of the magnetic circuit must be such at the point of interruption as to be prevented at least substantially from adversely affecting the symmetry of the erasing field. By arranging the part of the local saturation within the energising coil this requirement is satisfied, since the stray field is screened by the coil.

The invention will now be described with reference to the accompanying diagrammatic drawing, in which two embodiments thereof are shown by way of example, and in which.

Figure 1:
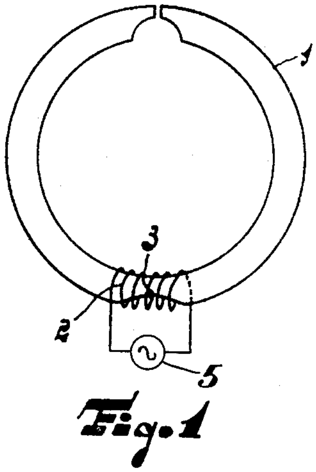
Fig. 1 shows a magnetic circuit comprising a local constriction.
Figure 2:
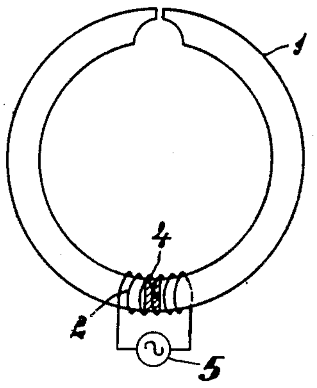
Fig. 2 shows a magnetic circuit which is made in part of material having a lower saturation field strength than the material of the remaining part.

Referring now to the figures, a coil 2 is wound on a magnetic circuit 1 in which an asymmetric flux is produced by passing through the coil alternating current, from a source 5, having an asymmetrical wave form. The circuit 1 contains means for limiting this flux, i.e. a local constriction 3 in the circuit shown in Figure 1, or a material 4 having a lower saturation field strength than the material of the remaining part in the circuit shown in Fig. 2. It is otherwise not necessary for these means to be arranged within the coil, since they may be positioned anywhere, provided the stray field of the saturation point in the magnetic circuit does not upset the symmetry, since otherwise the advantage of the invention would be lost wholly or in part.

What is claimed is:

1. An erasing device for erasing recorded signals on a signal-carrying medium, comprising a magnetic core having an interruption and a region of lower saturation field strength than other regions, the field strength of said region of lower saturation having a value enabling the establishment of a field strength at the interruption sufficient to erase the recorded signals, said region of lower saturation constituting a small region of reduced cross-sectional area remote from said interruption so that its stray field is minimized at said interruption, a winding coupled to said magnetic core, and means for passing an asymmetric alternating current through said winding, said region of lower saturation serving to establish a symmetrical alternating flux at said interruption.

2. An erasing device for erasing recorded signals on a signal-carrying medium, comprising a magnetic core constituted of two portions of different magnetic materials and containing an interruption in one of said portions, the other portion being constituted of the material possessing a lower saturation field strength and having a value enabling the establishment of a field strength at the interruption sufficient to erase the recorded signals, said other portion being remote from said interruption so that its stray field is minimized at said interruption, a winding coupled to said magnetic core, and means for passing an asymmetric alternating current through said winding, said other portion of the lower saturating material serving to establish a symmetrical alternating flux at said interruption.

3. An erasing device for erasing recorded signals on a signal-carrying medium, comprising a magnetic core having an interruption and at a portion opposed thereto a region of lower saturation field strengtth than other regions, the field strength of said region of lower saturation having a value enabling the establishment of a field strength at the interruption sufficient to erase the recorded signals, said region of lower saturation being remote from said interruption so that its stray field is minimized at said interruption, a winding coupled to said magnetic core and surrounding the region of lower saturation, and means for passing an asymmetric alternating current through said winding, said region of lower saturation serving to establish a symmetrical alternating flux at said interruption.

4. An erasing device for erasing recorded signals on a signal-carrying medium, comprising a magnetic circuit having an interruption and a region of lower saturation field strength than other regions, the field strength of said region of lower saturation having a value enabling the establishment of a field strength at the interruption sufficient to erase the recorded signals, said region of lower saturation being remote from said interruption so that its stray field is minimized at said interruption, a winding coupled to said magnetic circuit, and means for passing an asymmetric alternating current through said winding, said region of lower saturation serving to establish a symmetrical alternating flux at said interruption.

5. An erasing device as set forth in claim 4 wherein the region of lower saturation constitutes only a small part of the total magnetic circuit.

6. An erasing device as set forth in claim 2 wherein the lower-saturating material is a magnetic ferrite, and the other material is selected from the group consisting of ferro-silicon and $\mu$-metal.

7. An erasing magnetic head comprising an annular magnetic body having at one area a gap and at another area remote from said one area a portion of said annular body contiguous with adjacent portions but saturating at a lower field strength than said adjacent portions, and means coupled to said other area for introducing into said body a magnetic field capable of performing an erasing function in the gap.

8. An erasing magnetic head as set forth in claim 7 wherein said lower saturating portion comprises an integral portion of said magnetic head having a reduced cross-sectional area located diametrically opposite to said gap.

9. An erasing magnetic head as set forth in claim 7 wherein said lower saturating portion is located diametrically opposite to said gap and is constituted of a different magnetic material than the remainder of said body.

References Cited in the file of this patent

UNITED STATES PATENTS 2,768,243 Hare ------------------ Oct. 23, 1956

FOREIGN PATENTS 661,428 Great Britain ----------- Nov. 21, 1951

OTHER REFERENCES

Elements of Magnetic Tape Recording, Shaney, page 42, published 1950 by Amplifier Corp. of America.